No. 608,754. Patented Aug. 9, 1898.
T. COLEMAN, Jr., C. RUNYON & F. ZAHN.
APPARATUS FOR MANUFACTURING GLASSWARE.
(Application filed Feb. 10, 1898.)

(No Model.) 2 Sheets—Sheet 1.

WITNESSES:
Chas. P. Miller
F. E. Gaither

INVENTORS,
Thomas Coleman Jr.
Charles Runyon and
Frank Zahn
by Dennis Wolcott
Att'y.

THE NORRIS PETERS CO., PHOTO-LITHO., WASHINGTON, D. C.

No. 608,754. Patented Aug. 9, 1898.
T. COLEMAN, Jr., C. RUNYON & F. ZAHN.
APPARATUS FOR MANUFACTURING GLASSWARE.
(Application filed Feb. 10, 1898.)
(No Model.) 2 Sheets—Sheet 2.
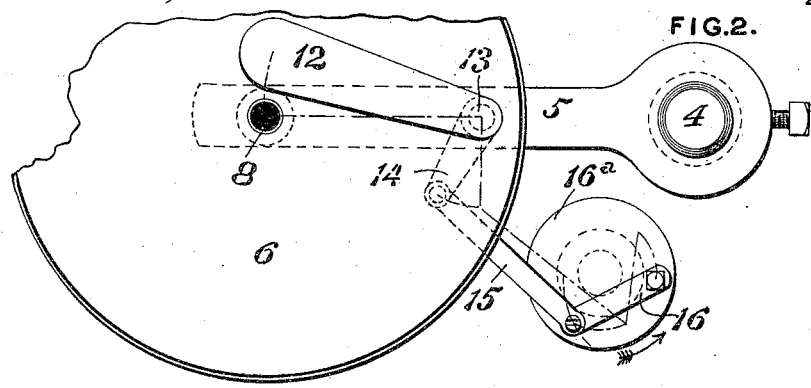
FIG. 2.
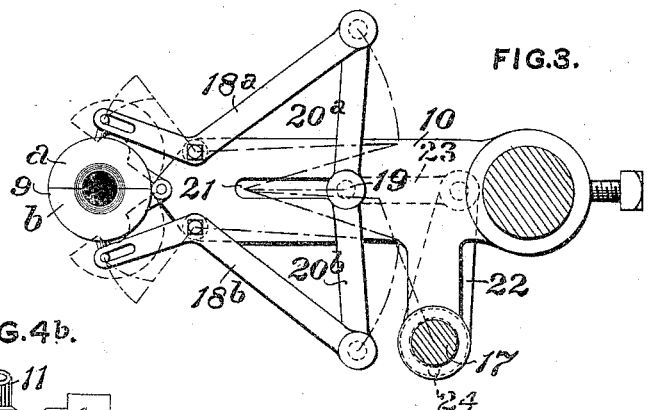
FIG. 3.
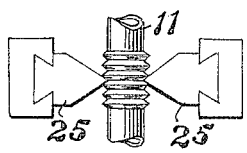
FIG. 4b.
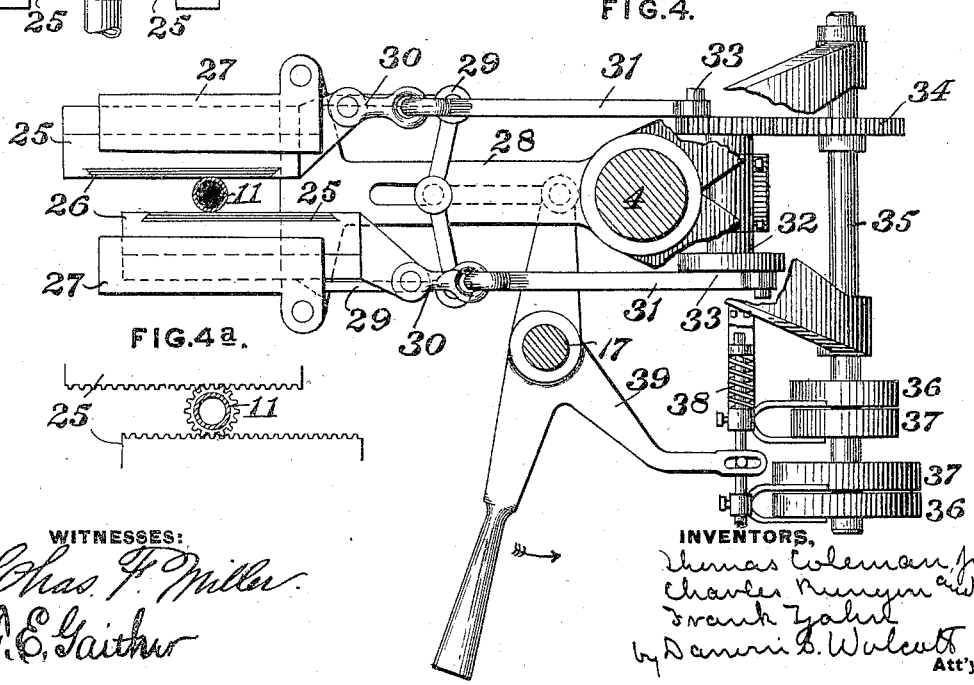
FIG. 4.
FIG. 4a.
WITNESSES:
Chas. F. Miller
J. E. Gaither
INVENTORS,
Thomas Coleman, Jr.
Charles Runyon and
Frank Zahn
by Daniel B. Wolcott
Att'y.

UNITED STATES PATENT OFFICE.

THOMAS COLEMAN, JR., AND CHARLES RUNYON, OF ROCHESTER, AND FRANK ZAHN, OF FREEDOM, PENNSYLVANIA.

APPARATUS FOR MANUFACTURING GLASSWARE.

SPECIFICATION forming part of Letters Patent No. 608,754, dated August 9, 1898.

Application filed February 10, 1898. Serial No. 669,787. (No model.)

*To all whom it may concern:*

Be it known that we, THOMAS COLEMAN, Jr., and CHARLES RUNYON, residing at Rochester, and FRANK ZAHN, residing at Freedom, in the county of Beaver and State of Pennsylvania, citizens of the United States, have invented or discovered certain new and useful Improvements in Apparatus for the Manufacture of Glassware, of which improvements the following is a specification.

Our invention relates more particularly to that class of apparatus for the manufacture of hollow articles of glassware wherein the proper amount of molten glass after first being gathered upon the end of a blowpipe and being made to conform approximately to the shape of the finished article by the manipulation of a workman skilled in the art is then inserted in what is ordinarily known as a "paste-mold." The blowpipe, being suitably centered above the mold, is caused to rotate, and air being simultaneously admitted therein from a source of supply under compression the molten glass is expanded to the desired shape, thereby receiving a highly-finished appearance.

The object of our invention is to provide an apparatus of the kind above described wherein means are provided whereby the opening and closing of the mold, centering and rotating of the blowpipe, and admission of air to the same at the proper time are all controlled by the movement of a single lever, thereby affording a single workman full control of the apparatus during the process of manufacture. A further object of our invention is to provide means for alternately rotating the blowpipe in opposite directions and controlling the speed of rotation at any time during the operation of blowing.

Figure 1:
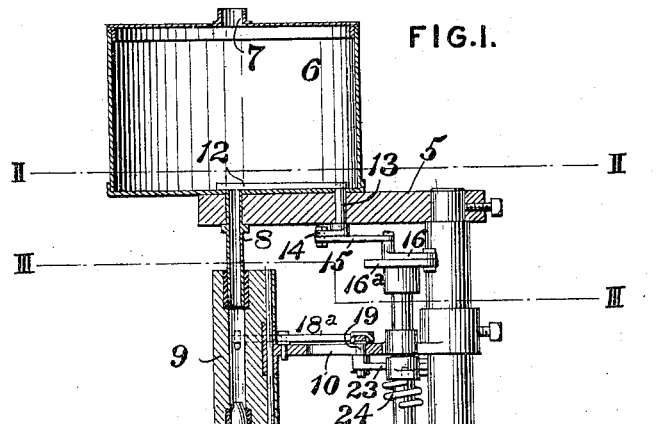
Figure 5:
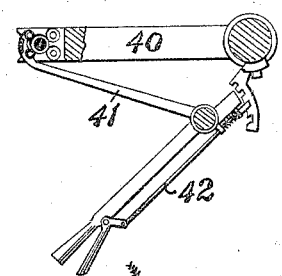

In the accompanying drawings, Figure 1 is a side elevation, partly in section, of a glass-blowing apparatus illustrating our invention; Fig. 2, a horizontal section on the line II II of Fig. 1, illustrating the valve mechanism for controlling the supply of fluid under pressure to the blowpipe; Fig. 3, a similar view illustrating the method of supporting the blowpipe at its upper end and connecting the same to the source of fluid under pressure; Fig. 4, a similar section on the line IIII IIII of Fig. 1, illustrating the means for rotating the blowpipe. Figs. $4^a$ and $4^b$ are diagrammatic views of modified forms of rotating blocks; Fig. 5, a horizontal section on the line V V of Fig. 1, illustrating the centering mechanism; and Fig. 6, a similar view of a modified form of the rotating mechanism.

In the practice of our invention we provide a stand or table 1, of any suitable construction, upon which is mounted the mold 2. It is preferred, however, to construct the stand in the form of a tank, as shown. The mold 2 rests upon and is secured to a vertically-movable plate 3, capable of being raised and lowered in said tank by suitable mechanism for the purpose of wetting the mold after each blow. This tank and mold, together with means for raising, lowering, opening, and closing the same, form the subject-matter of a separate patent, No. 560,974, granted to T. Coleman, Jr., and C. Runyon May 26, 1896, and need not be further described herein.

A vertical post or standard 4 is secured at its lower end to the table 1 and has secured at or near its upper end a horizontally-projecting arm or bracket 5, upon which is secured an air-reservoir 6, connected to any suitable source of supply through the medium of a pipe 7. A vertical pipe or nozzle 8, opening into the bottom of the reservoir 6, passes through and is secured to the arm 5 near its outer end and is located axially in line with the blowpipe and mold and serves to convey air from the reservoir 6 thereto. The lower end of the pipe 8 depends into and is inclosed by a cylindrical socket 9, supported upon and hinged to a horizontal plate or arm 10, secured to the upright standard 4. The socket 9 consists of two semicylindrical portions $a$ and $b$, hinged together and to the plate 10, said portions being opened and closed around the lower end of the pipe 8 and upper end of the blowpipe 11 in a manner to be presently described. The socket 9 is made of a sufficient length to accommodate varying lengths of blowpipes without any other further adjustments of the parts of the apparatus and is provided with facing of rubber or some similar material at its upper and lower ends in order to insure a snug fit around the pipe 8 and blowpipe 11 and at the same time allow the latter to rotate freely.

The supply of air from the reservoir 6 to the blowpipe 11 through the pipe 8 and socket 9 is controlled by means of a flat tongue-shaped valve 12, resting upon the bottom of the reservoir 6 and serving to open and close the upper end of the pipe 8. The valve 12 is secured at its outer end to the upper end of a vertical rod 13, journaled in the arm 5 and bottom of reservoir 6, near the wall of said reservoir, and is free to move back and forth radially across the upper end of the pipe 8 when the rod 13 is rotated. The rod 13 is rotated through the medium of a crank 14, secured to its lower end, which in turn is pivotally connected by a link 15 to a crank 16, pivoted upon a plate 16$^a$, secured to the upper end of a vertical rod 17, journaled near its upper end in a bearing secured to the post 4 and at its lower end in the table 1, through which it projects. As the crank 16 is adjustable radially around its pivot toward and from the axial center of the rod 17, it will be readily seen that the movement of the valve 12 relatively to the rotation of said rod is controlled by the distance between the center of rod and end of crank 16, where it is pivoted to link 15.

The two halves $a$ and $b$ of the socket 9 are pivotally connected on their peripheries to the short arms of two bell-cranks 18$^a$ and 18$^b$, pivoted to the plate 10. The long arms of said bell-cranks 18$^a$ and 18$^b$ diverge from each other toward the post 4 and are connected to a vertical pivot-pin 19 by means of links 20$^a$ and 20$^b$. Said pivot-pin slides in a slot 21, located in the plate 10 midway between the bell-cranks 18$^a$ and 18$^b$ and in a direction toward the socket 9. The pin 19 is pivotally connected by means of a link 23 to a crank 22, located upon the shaft 17, and is caused to move in the slot 21 when said shaft is rotated, thereby moving the arms 18$^a$ and 18$^b$ toward and from each other and causing the halves of the socket 9 to open and close around the blowpipe 11 and pipe 8. The crank 22 is journaled upon the shaft 17 and is connected thereto by means of a spiral spring 24, in order that an excessive rotation of said shaft will not disarrange or injure any of the moving parts just described.

The blowpipe 11 is caused to rotate in opposite directions alternately by means of blocks 25, provided with rubbing-faces 26, of rubber or other suitable material, fitted to reciprocate in opposite directions, respectively on opposite sides of the axial line of the blowpipe, in guide blocks or ways 27, pivotally connected at their inner ends to a horizontal plate or arm 28, secured to the upright standard 4 about midway of its height. The ways 27 and blocks 25 have a clamping movement imparted to them by means of rearwardly-projecting levers 29, secured to the rear ends of said ways. The levers 29 are connected to each other and to the shaft 17 by means of a system of links, pivot, and crank-arm similar in all respects to that described as connecting and operating the bell-cranks 18$^a$ and 18$^b$. The blocks 25 are connected by means of toggle-joints 30 and connecting-rods 31 to their operating mechanism located back of the standard 4, which consists of a short horizontal shaft 32, journaled at right angles to the rods 31 in bearings secured to the standard 4 and provided upon its ends with crank-disks 33, to which the rods 31 are connected in the usual manner. By means of the toggle-joints 30 the blocks 25 will be free to slide in the ways 27 no matter at what angle said ways are set relatively to the rods 31. One of the disks 33 is provided upon its periphery with teeth which mesh with a gear-wheel 34, located upon the main driving-shaft 35, journaled in bearings secured to the upright standard 4.

In blowing some articles of glassware it is desirable that the blowpipe should first be rotated swiftly and then at a less speed, or vice versa. To accomplish this the shaft 35 is provided upon one end with a series of fast and loose pulleys 36 and 37, respectively, one pair of said pulleys being larger than the other and so arranged upon the shaft that a large and a small loose pulley adjoin. By this arrangement it will be seen that when the belts upon the large and small pulleys are shifted simultaneously by means of the belt-shifter 38, secured to the standard 4 and operated by the handle 39, journaled upon the shaft 17, the speed will increase or decrease, as the case may be. While we have shown a belt-shifter connected to the apparatus, we do not confine ourselves to this particular form of construction, as a shifter located in any convenient place will do equally as well. The blowpipe 11 is further supported by means of two outwardly-projecting arms 40, secured to the standard 4 and provided with rollers in their outer ends, against which the blowpipe is securely held by means of a finger 41, also provided with rollers in its outer end, which is secured to the rod 17 and adapted to engage the blowpipe when the said rod is rotated in a direction to close the mold. The rod 17 is rotated and locked in any desired position by means of a handle 42, secured thereto and provided with any well-known locking device, as shown in Fig 5.

To the lower end of the rod 17 is secured a finger 43, which bears against the mold 2 and serves to close the same when the rod is rotated in a forward direction, the mold being opened in the manner described in Patent No. 560,974, before recited.

In the operation of our device the rod 17 is rotated in the direction of the arrow shown in Fig. 5 by means of the handle 42, thereby opening the mold 2, finger 41, blocks 25, and socket 9. The mold is then dipped in the tank and raised again into position. The operator, after forming a blow of glass of the desired shape upon the end of blowpipe, introduces the same into the mold, being guided by the stops 40. At the same time the rod 17 is rotated in a forward direction, thereby closing the mold, locking the pipe in position by means of finger 41 and socket 9, opening valve 12 to admit air to the blowpipe, said pipe being meanwhile rotated by the blocks 25 alternately first in one and then in the other direction until the blow is completed. The rod 17 is again rotated, the mold dipped, and the operation repeated. From the above it will be seen that the entire operation is controlled by the rotation of rod 17, the springs 24 allowing the moving parts to adjust themselves upon all sizes of pipes irrespective of each other. The speed may be increased or decreased at will by a simple movement of the handle 39.

If desired, the inner faces of the rubbing-blocks 25 may be provided with teeth to mesh with similar teeth upon the blowpipe 9, as shown in Fig. 4$^a$, or said rubbing-blocks may have edges upon their inner faces engaging grooves in the blowpipe, as illustrated in Fig. 4$^b$, which serve to support the blowpipe above the mold.

Figure 6:
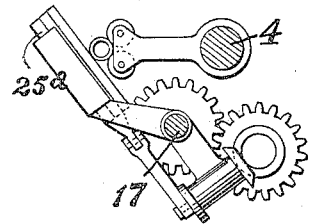

As illustrated in Fig. 6, a single rubbing-block 25$^a$ may be used, in which case it, together with its supporting and operating mechanism, may be supported upon the shaft 17 in such a manner as to allow the said rubbing-block to bear against the front of the blowpipe 11 when the shaft is rotated. In this form of construction the finger 41 can be dispensed with, as it will be obvious that the rubbing-block 25$^a$ performs its functions.

We claim as our invention and desire to secure by Letters Patent—

1. In an apparatus for the manufacture of glassware, the combination of a mold, a blowpipe, a nozzle connected with a source of air under pressure, and means for simultaneously closing the mold around the blowpipe and connecting blowpipe with nozzle, substantially as set forth.

2. In an apparatus for the manufacture of glassware, the combination of a mold, a blowpipe, a nozzle connected with a source of air under pressure, and means for simultaneously closing the mold, connecting blowpipe with nozzle and opening a valve controlling flow of air through nozzle, substantially as set forth.

3. In an apparatus for the manufacture of glassware, the combination of a mold, a blowpipe, a nozzle, mechanism for rotating blowpipe and means for simultaneously closing mold, connecting blowpipe to nozzle and shifting rotating mechanism to operative position with relation to blowpipe, substantially as set forth.

4. In an apparatus for the manufacture of glassware, the combination of a mold, a blowpipe, supports or bearings for blowpipe, mechanism for rotating blowpipe and adapted to hold the blowpipe in its supports or bearings, and means for closing the mold and shifting the rotating mechanism into operative position with relation to the blowpipe, substantially as set forth.

5. In an apparatus for the manufacture of glassware, the combination of a mold, a blowpipe, supports or bearings for blowpipe and means for simultaneously closing mold and clamping blowpipe in its supports or bearings, substantially as set forth.

6. In an apparatus for the manufacture of glassware, the combination of a mold, a blowpipe, a movable block adapted to bear against the blowpipe and impart a rotary motion thereto, means for simultaneously closing the mold and shifting the block to bear against the blowpipe and means for reciprocating the block, substantially as set forth.

7. In an apparatus for the manufacture of glassware, the combination of a mold, a blowpipe, a reservoir located above the blowpipe, a valve controlling the flow of air from the reservoir to the blowpipe, mechanism controlling the movement of said valve and means for closing the mold and connecting the blowpipe with the reservoir and simultaneously shifting the valve to admit air to the blowpipe, substantially as set forth.

8. In an apparatus for the manufacture of glassware, the combination of a mold, a blowpipe, a divided socket adapted to connect the blowpipe with a source of air under pressure and means for simultaneously closing the mold and closing the socket around the blowpipe, substantially as set forth.

9. In an apparatus for the manufacture of glassware the combination of a mold, a blowpipe, movable blocks adapted to bear against the blowpipe and impart a rotary motion thereto, means for simultaneously closing the mold and shifting the blocks to bear against the blowpipe and means for reciprocating the blocks, substantially as set forth.

10. In an apparatus for the manufacture of glassware the combination of a mold, a blowpipe, movable blocks adapted to bear against the blowpipe and impart a rotary means for closing the mold and shifting the blocks to bear against the blowpipe and means for imparting a variable reciprocating motion to the blocks, substantially as set forth.

11. In an apparatus for the manufacture of glassware the combination of a mold, a blowpipe, supports or bearings for blowpipe, a finger or hook adapted to hold the blowpipe in its bearings and means for simultaneously closing the mold and shifting the finger or hook into operative position with relation to the blowpipe, substantially as set forth.

In testimony whereof we have hereunto set our hands.

THOMAS COLEMAN, JR.
CHARLES RUNYON.
FRANK ZAHN.

Witnesses:
PHILIP BEUTEL,
WM. H. BLACK.